(12) United States Patent
Kondo (10) Patent No.: US 9,060,066 B2
(45) Date of Patent: Jun. 16, 2015

(54) DATA COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Yuichi Kondo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/333,974

(22) Filed: Jul. 17, 2014

(65) Prior Publication Data

US 2015/0055766 A1 Feb. 26, 2015

(30) Foreign Application Priority Data

Aug. 21, 2013 (JP) ................................. 2013-171707

(51) Int. Cl.
*H04M 11/00* (2006.01)
*H04M 3/54* (2006.01)
*H04N 1/00* (2006.01)

(52) U.S. Cl.
CPC ............ *H04M 3/54* (2013.01); *H04N 1/00413* (2013.01); *H04N 2201/3207* (2013.01); *H04N 2201/3209* (2013.01)

(58) Field of Classification Search
CPC .............. H04N 2201/0093; H04N 2201/0094; H04N 1/32416; H04N 1/32411; H04N 2201/0086; H04N 2201/3209; H04N 1/32037; H04N 1/32422; H04N 2201/3207; H04N 2201/3274; H04N 1/32048; H04N 1/3209; H04N 1/003
USPC ............ 379/100.01, 100.05, 100.06, 100.14; 358/440, 444
See application file for complete search history.

(56) References Cited

U.S. PATENT DOCUMENTS

| 8,773,695 B2 * | 7/2014 | Matoba ........................ 358/440 |
| 2013/0125234 A1 * | 5/2013 | Nishiyama .................... 726/21 |
| 2013/0250343 A1 * | 9/2013 | Tachi .......................... 358/1.14 |

FOREIGN PATENT DOCUMENTS

JP 2009-060527 A 3/2009

* cited by examiner

*Primary Examiner* — Stella Woo
(74) *Attorney, Agent, or Firm* — Fitzpatrick, Cella, Harper & Scinto (57) ABSTRACT

A data communication apparatus having a transfer function, and a method of controlling the same, wherein a list of stored addresses is displayed on a display unit, and when a transfer function is set, an address that becomes a transfer destination is selected in the list, and it is determined whether or not an editing restriction is set on the selected address. It is determined, when an editing target address is selected in the displayed list, whether an editing target address is set as the transfer destination and an editing restriction is set to the transfer destination, and if it is determined that the editing target address is set as the transfer destination and the editing restriction is set to the transfer destination, editing of the editing target address is restricted.

10 Claims, 7 Drawing Sheets

DATA COMMUNICATION APPARATUS, METHOD OF CONTROLLING THE SAME, AND STORAGE MEDIUM

BACKGROUND OF THE INVENTION

1. Field of the Invention

The present invention is related to a data communication apparatus, a method of controlling the same, and a storage medium.

2. Description of the Related Art

In conventional data communication apparatuses, there were those having a function for transferring received data such as FAX data to a predetermined transfer destination such as, for example, another data communication apparatus, another personal computer, or the like. Also, as an approach to conveniently specifying this kind of transfer destination, an address list allocated in advance to a fingertip key, a speed-dial, or the like, is displayed on an operation unit, and selection of the desired transfer destination in the displayed address list is performed.

Also, in a case where the specified transfer destination is changed, the previous address of the transfer destination, and the new address are stored in association. Also, determining, when received data is transferred to the previous address, whether or not to switch the transfer destination to the new address based on information of a log of communication and an address book, and notifying in the case of switching, has been proposed (see Japanese Patent Laid-Open No. 2009-60527).

However, in the above described conventional data communication apparatuses, the address allocated to a fingertip key, a speed-dial, or the like, can be changed due to a user, who does not recognize (does not know) transfer destination setting is performed, editing an address book. For this reason, in a case where the edited address in an address book is set as the transfer destination, there is the concern that the edited address will be used as is as the transfer destination, and that there will be the possibility that the received data (FAX, et cetera) will be mistakenly transferred.

SUMMARY OF THE INVENTION

An aspect of the present invention is to eliminate the above-mentioned problems with conventional technology.

A feature of the present invention is to provide a technique of preventing, when an address in a list of stored addresses is set to be a transfer destination, a user from editing the address without realizing that the address is set as the transfer destination by configuring such that it is possible to set whether or not to permit an editing of the address.

According to a first aspect of the present invention, there is provided a data communication apparatus having a transfer function, comprising: a list display unit configured to display a list of stored addresses on a display unit; a selection unit configured to select an address that becomes a transfer destination in the list when the transfer function is set; a setting unit configured to set whether or not an editing restriction is set on the address selected by the selection unit; a determination unit configured to determine whether or not, if an address of an editing target is selected in the list displayed by the list display unit, the address of the editing target is set as the transfer destination and the editing restriction is set to the transfer destination, and a control unit configured to control so as to, if it is determined by the determination unit that the address of the editing target is set as the transfer destination and the editing restriction is set to the transfer destination, restrict an editing of the address of the editing target.

According to a second aspect of the present invention, there is provided a data communication apparatus having a transfer function, comprising: a list display unit configured to display a list of stored addresses on a display unit; a selection unit configured to select an address that becomes a transfer destination in the list when the transfer function is set; a determination unit configured to determine whether or not, when an address of an editing target is selected in the list displayed by the list display unit, the address of the editing target is set as the transfer destination, and a control unit configured to control so as to, if it is determined by the determination unit that the address of the editing target is set as the transfer destination, restrict an editing of the address of the editing target.

According to a third aspect of the present invention, there is provided a data communication apparatus having a transfer function, comprising: a list display unit configured to display a list of stored addresses on a display unit; a selection unit configured to select an address that becomes a transfer destination in the list when the transfer function is set; a determination unit configured to determine whether or not, when an address of an editing target is selected in the list displayed by the list display unit, the address of the editing target is set as the transfer destination, and a control unit configured to control so as to, if it is determined by the determination unit that the address of the editing target is set as the transfer destination, display on the display unit a confirmation screen to allow a user to confirm that the transfer destination is changed by an editing of the address of the editing target.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
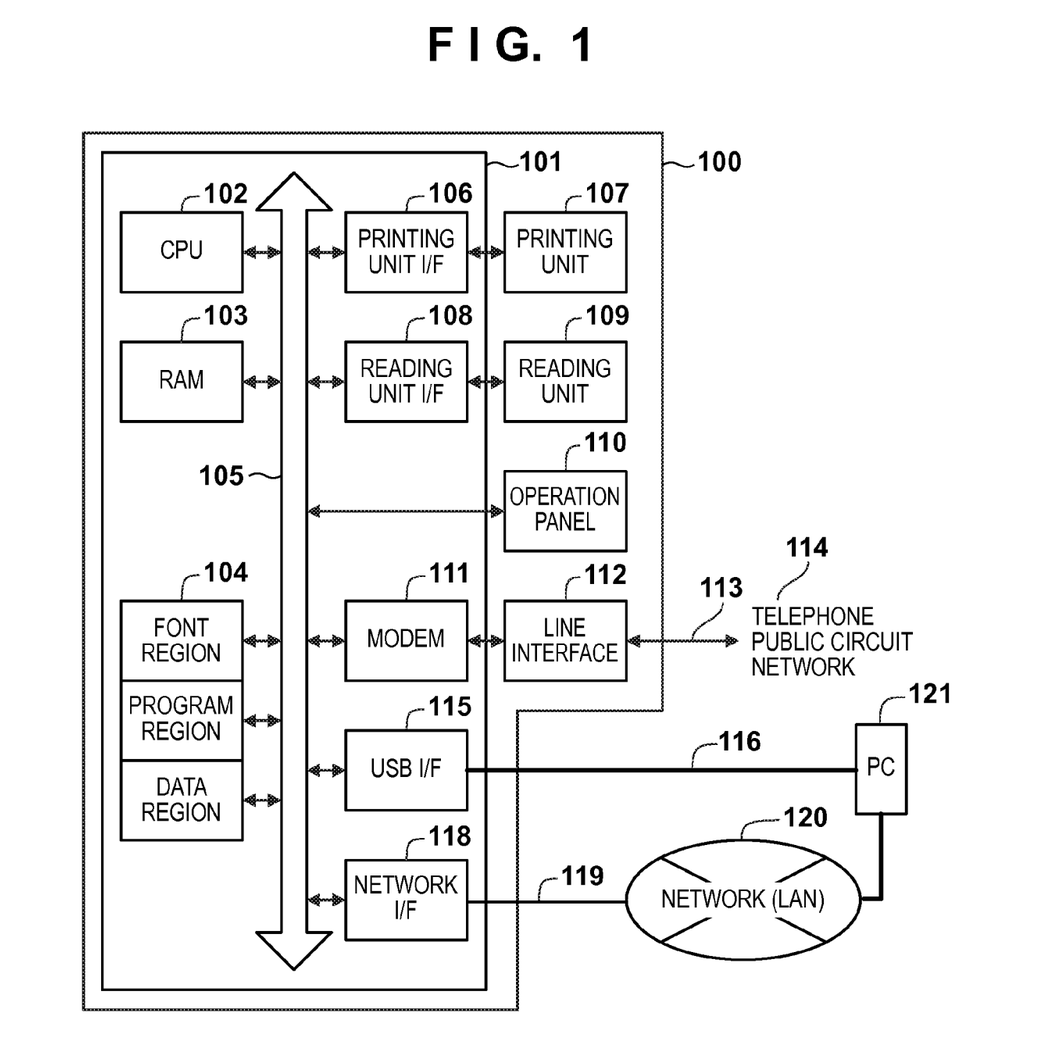
FIG. 1 is a block diagram for showing a configuration of a data communication apparatus according to an embodiment.

FIG. 1 is a block diagram for showing a configuration of a data communication apparatus 100 according to the embodiment. In the figure, each block shows a module. Arrows between the blocks shows a flow of data or an instruction.

The data communication apparatus 100 comprises a transfer function, and comprises a printing unit 107, a reading unit 109, an operation panel 110, a line interface 112, and a control unit 101 responsible for their control.

The control unit 101 includes a CPU 102, a RAM 103, a ROM 104, a printing unit I/F 106, a reading unit I/F 108, a modem 111, a USB I/F 115 and a network I/F 118, and each block is connected through a system bus 105.

The CPU 102 centrally controls each module described above in accordance with various control programs. Various control programs are executed by reading out control programs stored in a program region of the ROM 104. Alternatively, these programs are executed by decompressing and loading compressed program stored in the program region of the ROM 104 to the RAM 103. Also, various control programs previously described may be stored in a compressed state/a non-compressed state in a hard disk drive (HDD) not shown.

The network I/F 118 performs communication with a host computer 121 (PC in the figure) through a network (LAN) 120 and such. Also, the PC 121 is connected to the control unit 101 through the USB I/F 115 and a USB cable 116. The network I/F 118 and the network 120 are connected with a communication cable such as a LAN cable 119. The modem 111 connects to a telephone public circuit network 114 through the line interface 112, and performs communication processing with other data communication apparatuses, a facsimile apparatus, a telephone apparatus and such (not shown). The line interface 112 and the telephone public circuit network 114 are generally connected with a telephone line 113 and such.

The printing unit I/F 106 is responsible for an interface for outputting an image signal to the printing unit 107 (printer engine). Also, the reading unit I/F 108 is responsible for an interface for inputting an image signal from the reading unit 109 (scanner engine). In the case of copy processing, the CPU 102 processes image signals input from the reading unit I/F 108, and outputs recording image signals to the printing unit I/F 106.

The CPU 102 displays text and symbols in a display unit of the operation panel 110 with using font information stored in a font region of the ROM 104, and receives instruction information from the operation panel 110 which has received user instructions. Also, apparatus information of the data communication apparatus 100, the telephone directory information of the user and such are stored in the data region of the ROM 104, and are read out as necessary by the CPU 102.

The data communication apparatus 100 is assumed to include a copy function with the reading unit 109 and the printing unit 107, and a scan function with the reading unit 109 and the USB I/F 115 or the network I/F 118. In addition, the data communication apparatus 100 includes a facsimile function with the modem 111 and a function for performing printing (print), an instruction for which is received from the PC 121 via the USB cable 116 or the network 120.

In the FIG. 1, configuration is taken in which the reading unit 109 and the printing unit 107 are inside of the data communication apparatus 100, but the configuration may be taken in which each unit or both units are outside of the data communication apparatus 100.

Figure 2:
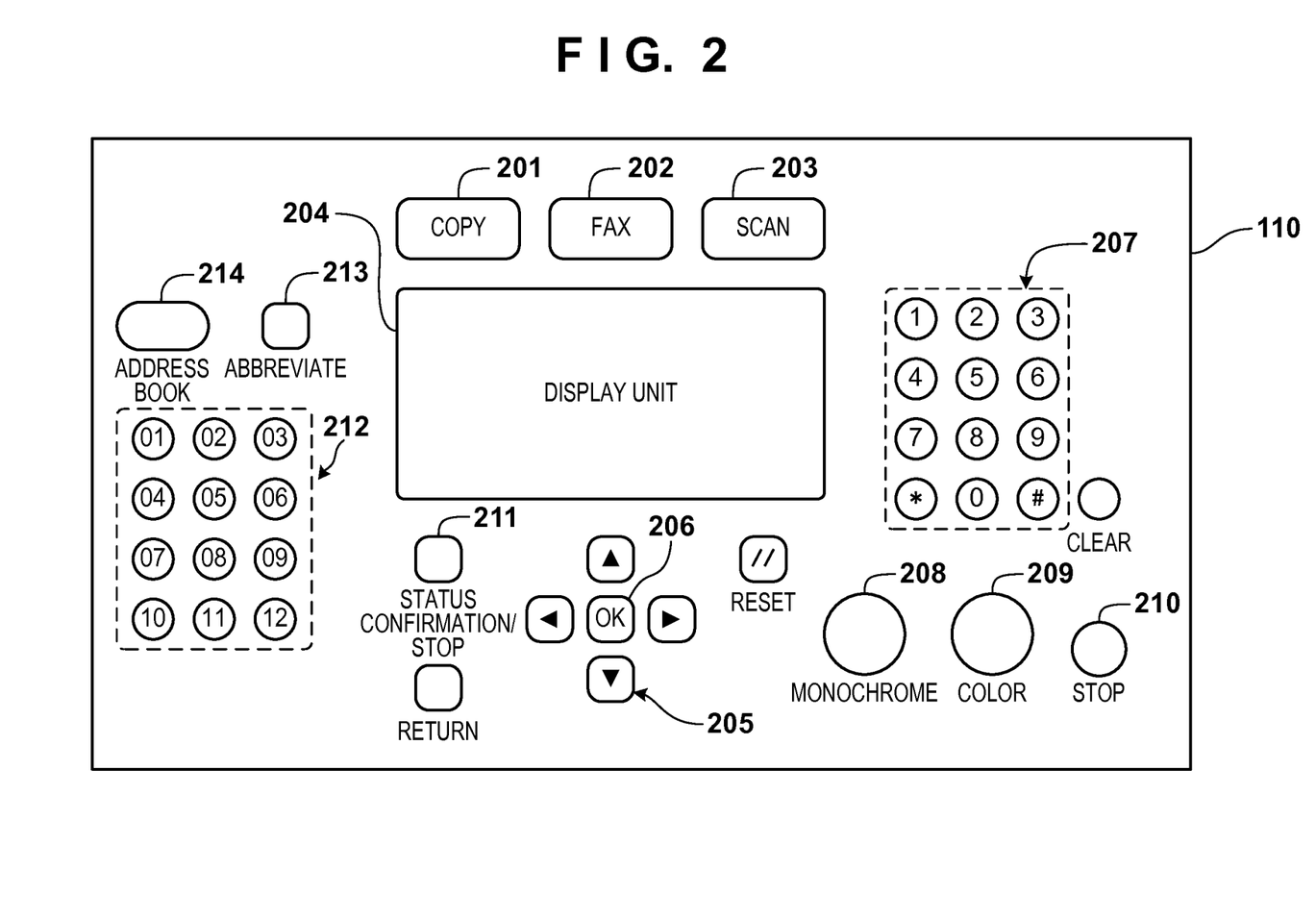
FIG. 2 depicts a top view of an operation panel of the data communication apparatus according to the embodiment.

FIG. 2 depicts a top view of the operation panel 110 of the data communication apparatus 100 according to the embodiment.

There are function keys 201-203 on the operation panel 110 to select the above described functions, and by pressing the button of the function the user wishes to use, the user can instruct the execution of the function. Also, the operation panel 110 includes a display unit 204 to notify the setting status and the device status of the data communication apparatus 100 to the user. Arrow keys 205 are used to move a cursor displayed in the display unit 204. The arrow keys 205 include 4 keys of up, down, left and right. An OK key 206 is arranged in the center of the arrow keys 205, and includes the function of "the deciding key" corresponding to setting and queries. The user employs a numeric keypad 207 for inputting the number of copies, a telephone number in a facsimile function and such. The operation panel 110 includes a monochrome start key 208 and a color start key 209 as keys for instructing the start of copying, scanning, and facsimile. There are cases where the operation panel 110 does not have an individual start key 208 and 209 as shown in FIG. 2, in a case where the data communication apparatus includes a function by which it is possible to distinguish between a color original and a monochrome original when reading the original. A stop key 210 is the key for instructing the stopping of the operation of each function. Meanwhile, in a case of stopping operation, the user, using a status confirmation/stop key 211, can stop the processing the user wishes to stop by selecting the processing from a status confirmation screen for processing being executed on the data communication apparatus 100 currently. In such a case as well, the arrow keys 205 and the OK key 206 are used for selection/determination.

There are fingertip keys 212, an abbreviated key 213 and an address book key 214 as a way of specifying an address conveniently when performing a facsimile transmission or a data transmission. One address is registered to each button of the fingertip keys 212, and by pressing a desired button of the fingertip keys 212, the address registered to the button can be specified as a destination of transmission. Regarding speed-dial, by pressing the abbreviated key 213, the screen prompting to input the number is displayed, and by inputting the number allocated to the desired address with the numeric keypad 207, an address registered to the input number can be specified as a destination of transmission. By pressing the address book key 214, an address list registered in the data communication apparatus 100 (address book) is displayed, and the user selects a desired address with the arrow keys 205 from the list, and determines the selected address as a destination of transmission by pressing the OK key 206.

Figure 3:
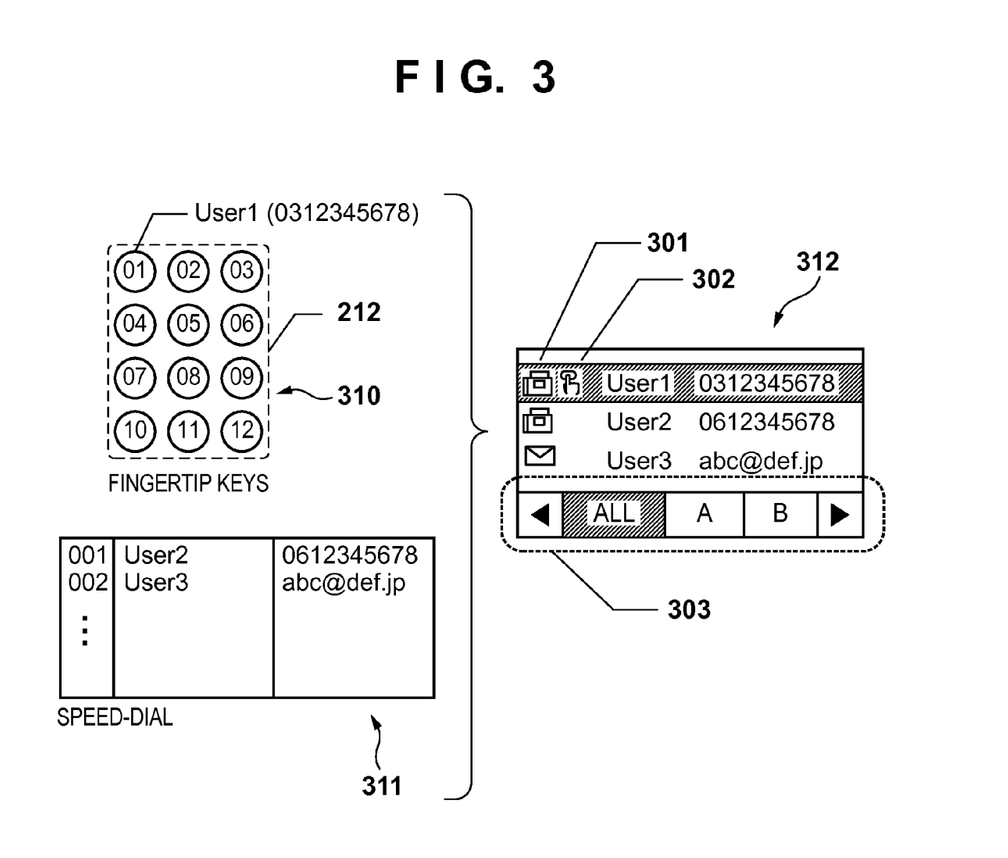
FIG. 3 depicts a view for showing a relation between a fingertip key and a speed-dial and an address book in the data communication apparatus according to the embodiment.

FIG. 3 depicts a view for showing a relation between a fingertip key and a speed-dial and an address book in the data communication apparatus 100 according to the embodiment.

In the FIG. 3, "User1" (the telephone number: 0312345678) is assigned to the key "01" of the fingertip keys 212 as denoted by numeral 310. Also, as denoted by numeral 311, "User2" (the telephone number: 0612345678) is assigned to "001", and "User3" (the address: abs@def.jp) is assigned to "002" as the speed-dial. In order to specify the speed-dial, the user presses the abbreviated key 213 and then inputs the registered number using the numeric keypad 207. The address registered to the fingertip key and the speed-dial can be also used by referencing the address book. The address book is displayed by pressing the address book key 214.

In the FIG. 3, numeral 312 denotes an example of displaying the address book. In this display of the address book, the protocol corresponding to the registered address is shown in an icon 301. In the FIG. 3, "User1" and "User2" indicate FAX, and "User3" indicates e-mail. An icon 302 shows whether the registered address is assigned to the fingertip key or not. In the FIG. 3, it is shown that "User1" is assigned to the fingertip key. The items displayed in the address book can be switched by a tab 303. In the example of FIG. 3, the tabs of "all", "the addresses starting with "A", and "the addresses starting with "B" are displayed. The currently selected item in the address and the tab is invertedly displayed. Accordingly, in the example of FIG. 3, it is shown that displaying all of the items in the address book is selected, and "User1" is selected.

Figure 4:
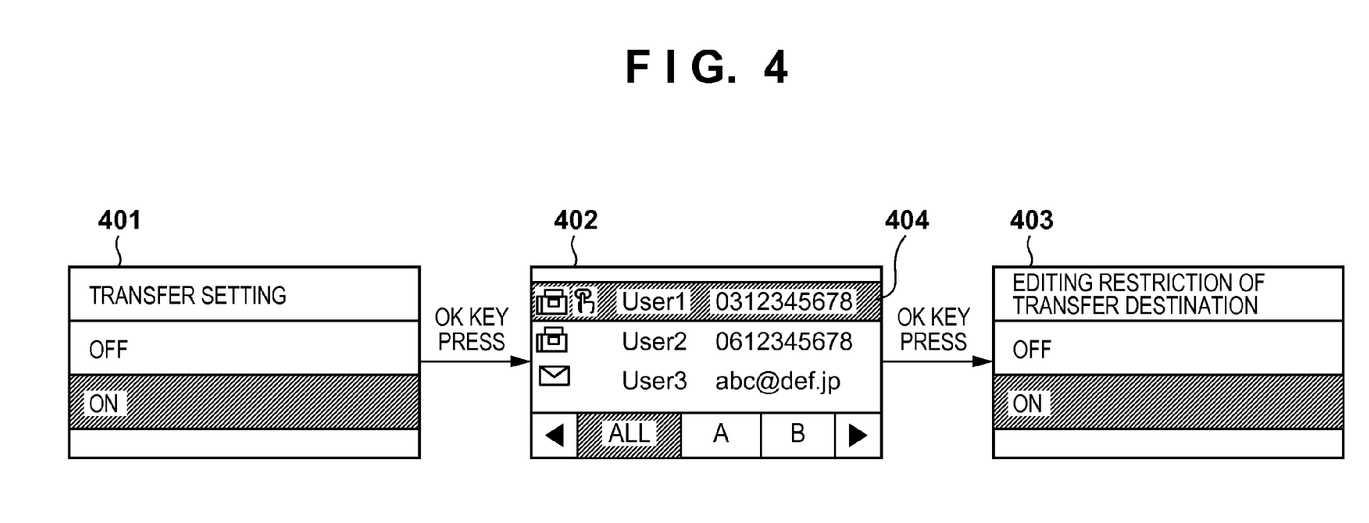
FIG. 4 depicts a view for showing a screen flow in a case where transfer setting is performed in order to transfer received data such as FAX data in the data communication apparatus according to the embodiment.

FIG. 4 depicts a view for showing a screen flow in a case where transfer setting is performed in order to transfer received data such as FAX data in the data communication apparatus 100 according to the embodiment.

A screen 401 shows a view for illustrating a screen for setting the enabling/disabling (ON/OFF) of transferring of received data such as FAX data. In the screen 401, the transferring of the received data is not performed when OFF is selected. In a case where ON is selected as shown in the screen 401, the screen 401 shifts to a screen 402 upon the pressing of the OK key 206. The screen 402 is showing the address list registered in the address book. In this screen 402, the user moves a cursor 404 with the arrow keys 205 and presses the OK key 206, and then the address selected by the cursor 404 is specified as the transfer destination. In this screen 402, "User1" is selected.

Then, the screen 402 shifts to a screen 403 when the OK key 206 is pressed during the screen 402 is being displayed. The screen 403 displays a screen for setting whether or not to restrict an editing of the transfer destination. In the screen 403, editing of the transfer destination is not restricted in a case where OFF is selected, and editing of the transfer destination is restricted in a case where ON is selected as shown in the screen 403. Note, here configuration is taken such that the user is allowed to select whether an editing restriction is necessary or not when transfer setting is performed, but configuration may be taken such that the editing is restricted without an instruction from the user in a case of setting as a transfer destination.

Figure 5:
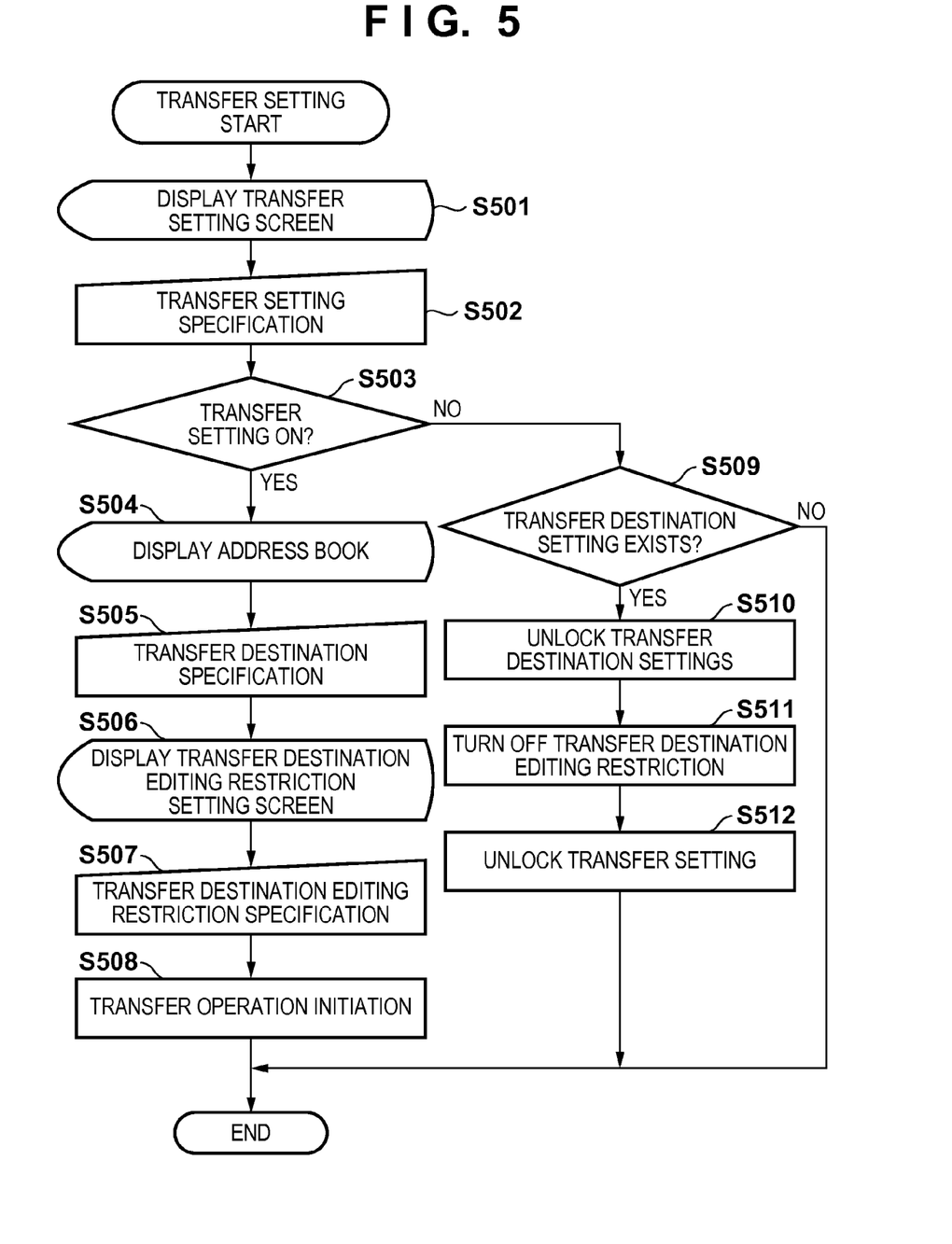
FIG. 5 is a flowchart for describing transfer setting processing for transferring received data such as FAX data in the data communication apparatus according to the embodiment.

FIG. 5 is a flowchart for describing transfer setting processing for transferring received data such as FAX data in the data communication apparatus 100 according to the embodiment. The program executing this processing is stored in the program region of the ROM 104, is deployed into the RAM 103 upon execution, and is executed under the control of the CPU 102.

Firstly the CPU 102 displays a transfer setting screen 401 such as a screen shown in FIG. 4 on the display unit 204 in step S501, and then the processing proceeds to step S502. In step S502, the CPU 102 receives the specification of transfer setting via the operation panel 110 from the user, and then the processing proceeds to step S503. In step S503, the CPU 102 determines whether transfer setting is set to ON in the transfer setting screen 401 or not In a case where the transfer setting is set to ON, the processing proceeds to step S504, and in a case where the transfer setting is set to OFF, the processing proceeds to step S509.

In step S504, the CPU 102 displays the address book screen 402 such as FIG. 4, for example, and then the processing proceeds to step S505. In step S505, the CPU 102 receives the specification of the transfer destination via the operation panel 110 from the user, and then the processing proceeds to step S506. In step S506, the CPU 102 displays the setting screen 403 of the editing restriction of the transfer destination such as FIG. 4, for example, and then the processing proceeds to step S507. In step S507, the CPU 102 receives the specification of the editing restriction of the transfer destination via the operation panel 110 from the user, and then the processing proceeds to step S508. In step S508, the CPU 102 initiates a transfer operation, and the processing completes.

In a case where the transfer setting is set to OFF in the transfer setting screen 401, the CPU 102 determines whether the setting of the transfer destination previously set exists or not in step S509. In a case where a setting of a transfer destination exists, the processing proceeds to step S510, and in a case where a setting of a transfer destination does not exist, this processing is completed. In step S510, the CPU 102 unlocks all of the settings of transfer destinations previously set, and the processing proceeds to step S511. In step S511, the CPU 102 sets the setting of the editing restriction of the transfer destination to OFF, the processing proceeds to step S512. In step S512, the CPU 102 unlocks transfer setting so not to execute the transfer operation, and the processing completes.

Figure 6:
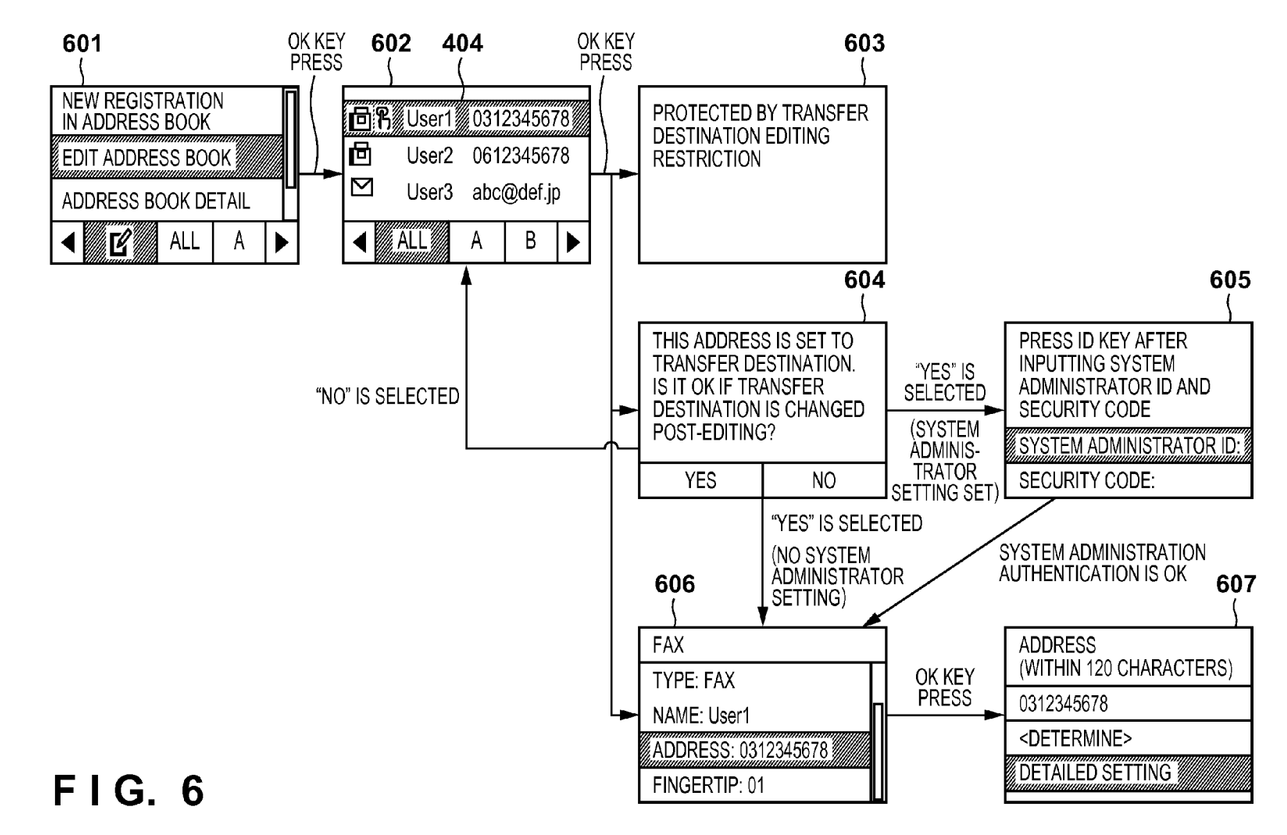
FIG. 6 depicts a view for explaining screen transitioning in a case where an address book is edited in the data communication apparatus according to the embodiment.

FIG. 6 depicts a view for explaining screen transitioning in a case where an address book is edited in the data communication apparatus 100 according to the embodiment.

A screen 601 shows the screen for selecting "edit the address book". In the screen 601, "edit the address book" is selected, and the screen shifts to a screen 602 with the OK key 206 on the operation panel 110. The screen 602 shows an example of displaying the address list registered in the address book, and the user moves the cursor 404 with the arrow keys 205, and the address to be edited is specified with the OK key 206. At this time, in a case where the address to be edited is set to the transfer destination and the setting of the editing restriction of the transfer destination is ON, the screen shifts to a screen 603. On the other hand, the screen shifts to a screen 604 in a case where the setting of the editing restriction of the transfer destination is OFF. Also, in a case where the address is not set to the transfer destination, the screen shifts to a screen 606.

The screen 603 shows an example of a screen displaying the editing restriction of the transfer destination. In the screen 603, for the reason that the address specified in the editing of the address book is set to the transfer destination, the message "protected by the editing restriction of the transfer destination" is displayed, and the user is notified that it is impossible to edit the address.

The screen 604 shows a screen for displaying an editing confirmation of the transfer destination. In the screen 604, for the reason that the address specified in the editing of the address book is set to the transfer destination but the editing restriction is OFF, the message "the address is set to the transfer destination. Is it OK if the transfer destination is changed after editing of the address?" is displayed, and the confirmation of the editing is performed for the user. Then, in a case where "NO" is selected in the screen 604, the screen returns to the screen 602 without performing editing of the address. On the other hand, in a case where "YES" is selected in the screen 604, the screen shifts to a screen 605 if the setting of system administrator is set, and the screen shifts to a screen 606 if the setting of system administrator is not set.

The screen 605 shows a screen for displaying the authentication of system administrator. In the screen 605, the screen shifts to the screen 606 only after the information of a system administrator is input and the authentication is OK. The screen 606 shows a screen for displaying destination information specified in editing of the address book. In the screen 606, the screen shifts to a screen 607 in a case where the address is selected and the OK key 206 on the operation panel 110 is pressed. The screen 607 shows a screen for displaying the editing of the address. The user inputs the telephone number of the address, or an address and such on the screen 607, then selects "determined". With this, the address selected in the address book is changed to the address newly input.

Figure 7:
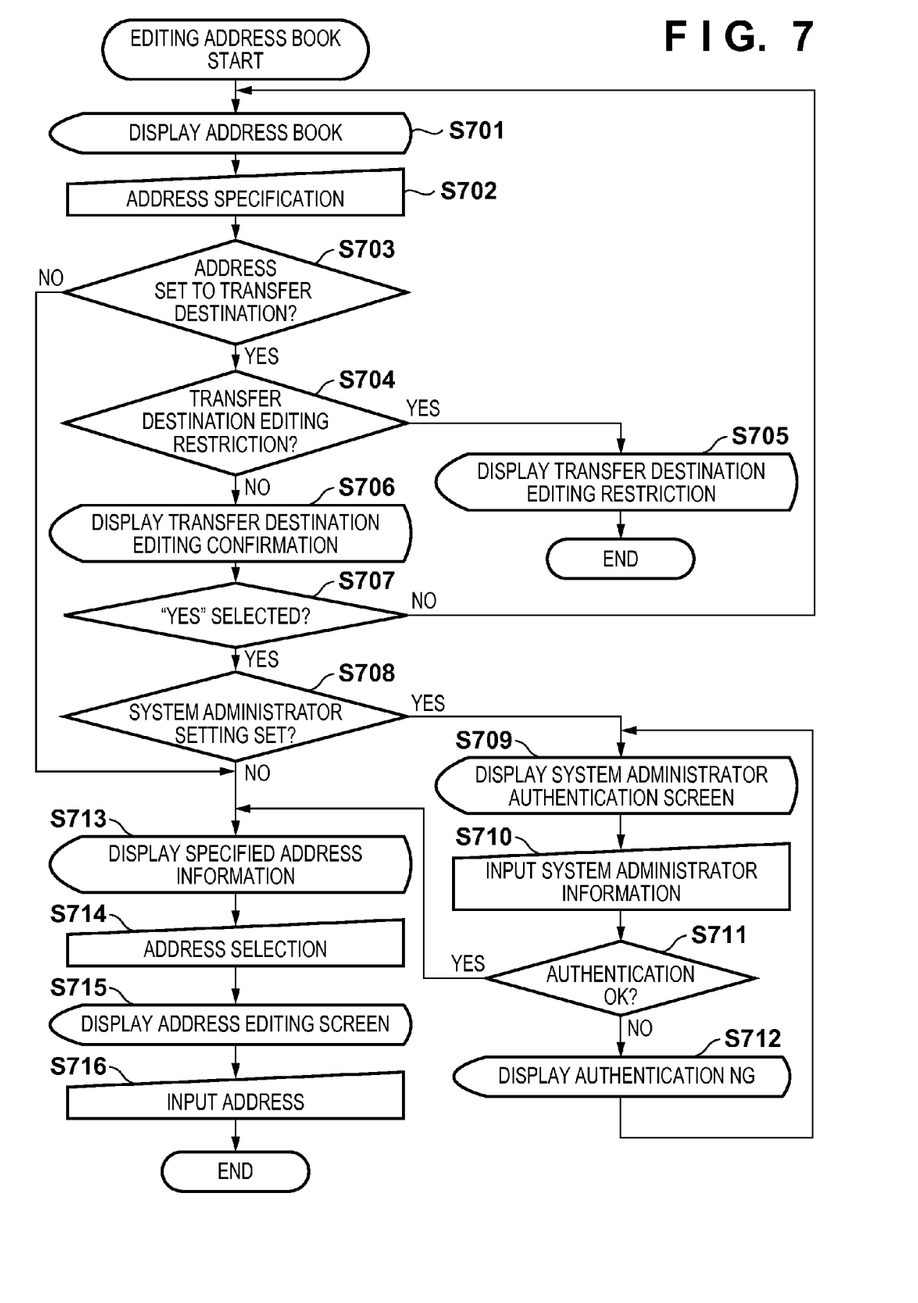
FIG. 7 is a flowchart for describing address book editing processing in the data communication apparatus according to the embodiment.

FIG. 7 is a flowchart for describing address book editing processing in the data communication apparatus 100 according to the embodiment. Note, the program executing this processing is stored in the program region of the ROM 104, is deployed into the RAM 103 upon execution, and is executed under the control of the CPU 102.

Firstly the CPU 102 displays an address book screen 602 such as a screen shown in FIG. 6, for example, on the display unit 204 in step S701, and then the processing proceeds to step S702. In step S702, the CPU 102 receives the specification of an address of the editing target via the operation panel 110 from the user, and then the processing proceeds to step S703. In step S703, the CPU 102 determines whether the address of the editing target is set to the transfer destination or not. The processing proceeds to step S704 in a case where the address of the editing target is set to the transfer destination, and the processing proceeds to step S713 in a case where the address of the editing target is not set to the transfer destination. In step S704, the CPU 102 determines whether or not an editing restriction for the address is set. The processing proceeds to step S705 in a case where the setting of the editing restriction is ON (the editing restriction is set), and the CPU 102 displays an editing restriction screen 603 such as that in FIG. 6, for example, and the processing completes with the restriction of editing the address.

On the other hand, the processing proceeds to step S706 in a case where the setting of the editing restriction is OFF. In step S706, the CPU 102 displays an editing confirmation screen 604 for the transfer destination such as that of FIG. 6, for example, and then the processing proceeds to step S707. In step S707, the CPU 102 determines a confirmation operation for confirming whether or not the user selects "YES" in the editing confirmation screen 604. The processing proceeds to step S708 in a case where the user selects "YES", and the processing returns to step S701 in a case where the user selects "NO". In step S708, the CPU 102 determines whether or not setting of a system administrator is set. The processing proceeds to step S709 in a case where the setting of system administrator is set, and the processing proceeds to step S713 in a case where the setting of system administrator is not set. In step S709, the CPU 102 displays an authentication screen 605 for system administrator such as that of FIG. 6, for example, on the display unit 204, and the processing proceeds to step S710. In step S710, the CPU 102 receives the input of the information of the system administrator via the operation panel 110 from the user. Then, the processing proceeds to step S711 when the information of the system administrator is input. In step S711, the CPU 102 performs the authentication of the information of the system administrator input in step S710, and determines whether or not the authentication succeeds (OK). In step S711, the processing proceeds to step S713 in a case where the CPU 102 determines the authenticating succeeds, and the processing proceeds to step S712 in a case where the CPU 102 determines the authentication is NG. In step S712, the CPU 102 displays a screen (not shown) showing that the authentication of the system administrator is NG, and the processing returns to step S709.

In step S713, the CPU 102 displays the information screen 606 of the address specified to the editing target in the address book, shown in FIG. 6 for example, on the display unit 204, and the processing proceeds to step S714. In step S714, the CPU 102 receives the selection of the address via the operation panel 110 from the user, and then the processing proceeds to step S715. In step S715, the CPU 102 displays the address editing screen 607 of such as FIG. 6 for example, on the display unit 204, and the processing proceeds to step S716. In step S716, the CPU 102 receives the input of the new address via the operation panel 110 from the user. Then the address is set to the new address in a case where the user selects "determined" in the screen 607, and the processing completes.

As explained above, according to this embodiment, it is determined whether the address of the editing target is set to the transfer destination or not when the address allocated to the fingertip key or the speed-dial is changed by editing the address book. In a case where the target address is set to the transfer destination, the transfer destination editing restriction screen is displayed in a case where the editing restriction of the transfer destination is set, and the user is notified that the target address is protected by the editing restriction. Also, in a case where the editing restriction of the transfer destination is disabled, it becomes possible to display the editing confirmation screen to confirm with the user that the transfer destination is changed post-editing.

With this, it becomes possible for a user who does not recognize (does not know) whether the address of the editing target is set to the transfer destination or not to confirm that the address of the editing target is being used for the transfer destination. Also, it becomes possible to prevent a mistaken transfer such that data being transferred to a transfer destination unintended by the user because the address is changed inadvertently.

As explained above, according to this embodiment, when the address allocated to the fingertip key or the speed-dial is changed, if an address of the editing target is set to the transfer destination, the editing restriction screen is displayed if the editing restriction of the address is effective. Also, if the editing restriction of the address is ineffective, it becomes possible to display the editing confirmation screen of the address.

With this, it becomes possible for a user who does not recognize (does not know of) the existence of the transfer setting to confirm that the address of the editing target is being used for the transfer destination, and it is possible to avoid a mistaken transmission to a transfer destination unintended by the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)BD)he present invention can also be realized by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171707, filed Aug. 21, 2013, which is hereby incorporated by reference herein in its entirety.

What is claimed is:

1. A data communication apparatus having a transfer function, comprising:
   a list display unit configured to display a list of stored addresses on a display unit;
   a selection unit configured to select an address that becomes a transfer destination in the list when the transfer function is set;
   a setting unit configured to set whether or not an editing restriction is set on the address selected by the selection unit;
   a determination unit configured to determine whether or not, if an address of an editing target is selected in the list displayed by the list display unit, the address of the editing target is set as the transfer destination and the editing restriction is set to the transfer destination, and
   a control unit configured to control so as to, if it is determined by the determination unit that the address of the editing target is set as the transfer destination and the editing restriction is set to the transfer destination, restrict an editing of the address of the editing target.

2. The data communication apparatus according to claim 1, wherein if it is determined by the determination unit that the address of the editing target is set as the transfer destination and the editing restriction is not set to the transfer destination, the control unit displays a confirmation screen for allowing a user to confirm that the transfer destination is changed due to an editing of the address of the editing target on the display unit, and controls an editing of the address of the editing target in accordance with a confirmation operation of the user via the confirmation screen.

3. The data communication apparatus according to claim 1, wherein if it is determined by the determination unit that the address of the editing target is set as the transfer destination, and the editing restriction is not set to the transfer destination, the control unit displays an authentication screen for allowing the user to perform an authentication of information of an administrator on the display unit, and enables an editing of the address of the editing target by the user, who succeeds at an authentication.

4. The data communication apparatus according to claim 1, further comprising:
   a transfer setting unit configured to set ON/OFF of the transfer function; and
   a cancel unit configured to cancel, if the transfer function is set to OFF by the transfer setting unit, a previously set setting of the transfer function.

5. A data communication apparatus having a transfer function, comprising:
   a list display unit configured to display a list of stored addresses on a display unit;
   a selection unit configured to select an address that becomes a transfer destination in the list when the transfer function is set;
   a determination unit configured to determine whether or not, when an address of an editing target is selected in the list displayed by the list display unit, the address of the editing target is set as the transfer destination, and
   a control unit configured to control so as to, if it is determined by the determination unit that the address of the editing target is set as the transfer destination, restrict an editing of the address of the editing target.

6. A data communication apparatus having a transfer function, comprising:
   a list display unit configured to display a list of stored addresses on a display unit;
   a selection unit configured to select an address that becomes a transfer destination in the list when the transfer function is set;
   a determination unit configured to determine whether or not, when an address of an editing target is selected in the list displayed by the list display unit, the address of the editing target is set as the transfer destination, and
   a control unit configured to control so as to, if it is determined by the determination unit that the address of the editing target is set as the transfer destination, display on the display unit a confirmation screen to allow a user to confirm that the transfer destination is changed by an editing of the address of the editing target.

7. A method of controlling a data communication apparatus having a transfer function, comprising:
   displaying a list of stored addresses on a display unit;
   selecting an address that becomes a transfer destination in the list when the transfer function is set;
   setting whether or not an editing restriction is set on the address selected in the selecting;
   determining whether or not, when an address of an editing target is selected in the list displayed in the displaying, the address of the editing target is set as the transfer destination and the editing restriction is set for the transfer destination, and
   controlling so as to, if it is determined in the determining that the address of the editing target is set as the transfer destination and the editing restriction is set for the transfer destination, restrict an editing of the address of the editing target.

8. A method of controlling a data communication apparatus having a transfer function, comprising:
   displaying a list of stored addresses on a display unit;
   selecting an address that becomes a transfer destination in the list when the transfer function is set;
   determining whether or not, when an address of an editing target is selected in the list displayed in the displaying step, the address of the editing target is set as the transfer destination, and
   controlling so as to, if it is determined in the determining that the address of the editing target is set as the transfer destination, restrict an editing of the address of the editing target.

9. A method of controlling a data communication apparatus having a transfer function, comprising:
   displaying a list of stored addresses on a display unit;
   selecting an address that becomes a transfer destination in the list when the transfer function is set;
   determining whether or not, when an address of an editing target is selected in the list displayed in the displaying, the address of the editing target is set as the transfer destination, and
   controlling so as to, if it is determined in the determining that the address of the editing target is set as the transfer destination, display on the display unit a confirmation screen to allow a user to confirm that the transfer destination is changed by an editing of the address of the editing target.

10. A non-transitory computer-readable storage medium storing a program for causing a computer to function as the data communication apparatus according to claim 1.

* * * * *